July 6, 1965　　　B. E. BELL ETAL　　　3,193,656
METHOD AND APPARATUS FOR THE AUTOMATIC WELDING
OF JOINTS BETWEEN END ABUTTING STATIONARY
SECTIONS OF PIPE OR THE LIKE
Filed April 21, 1961　　　　　　　　　　　4 Sheets-Sheet 1

INVENTORS.
Billy E. Bell
Bernard V. Elliott
BY
Hovey, Schmidt, Johnson & Hovey
ATTORNEYS.

July 6, 1965

B. E. BELL ETAL 3,193,656

METHOD AND APPARATUS FOR THE AUTOMATIC WELDING
OF JOINTS BETWEEN END ABUTTING STATIONARY
SECTIONS OF PIPE OR THE LIKE

Filed April 21, 1961

INVENTORS.
Billy E. Bell
Bernard V. Elliott

BY

Hovey, Schmidt, Johnson & Hovey
ATTORNEYS.

July 6, 1965

B. E. BELL ETAL 3,193,656

METHOD AND APPARATUS FOR THE AUTOMATIC WELDING
OF JOINTS BETWEEN END ABUTTING STATIONARY
SECTIONS OF PIPE OR THE LIKE

Filed April 21, 1961

INVENTORS.
Billy E. Bell
Bernard V. Elliott

BY

Hovey Schmidt, Johnson & Hovey
ATTORNEYS.

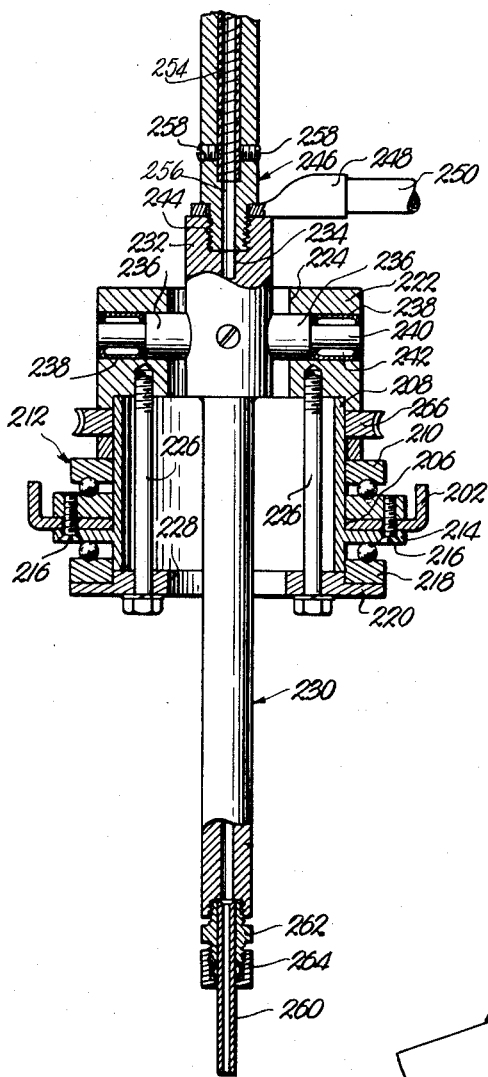

United States Patent Office 3,193,656
Patented July 6, 1965

3,193,656
METHOD AND APPARATUS FOR THE AUTOMATIC WELDING OF JOINTS BETWEEN END ABUTTING STATIONARY SECTIONS OF PIPE OR THE LIKE
Billy E. Bell, Tulsa, Okla., and Bernard V. Elliott, Anderson, Mo., assignors of one-half each to Crose-Perrault Equipment Corporation, Tulsa, Okla., a corporation of Oklahoma, and H. C. Price Co., Bartlesville, Okla., a corporation of California
Filed Apr. 21, 1961, Ser. No. 104,701
18 Claims. (Cl. 219—60)

This invention relates to automatic welding equipment and particularly to welding apparatus useful in interconnecting relatively large pipe sections disposed in end-to-end relationship.

In the laying of large diameter pipe for use in conveying oil and natural gas over long distances, it is conventional practice to transport the pipe in sections to the area in which the pipe is to be buried, whereupon the sections are welded together prior to placement of the same in the trenches which have been dug in the ground. The pipe sections are placed end-to-end alongside the trench and crews then manually interconnect the pipe sections with portable welding units. This practice has required the utilization of at least twenty welders working simultaneously on a number of pipe sections to fill the joint between the beveled ends of the pipe sections located in abuttting, aligned relationship. In welding the pipe sections together, it is required that a number of passes be made around each of the pipe section joints in order to completely fill the area therebetween with the weldment. This is accomplished by first running a stringer bead around the joint followed by a number of filler beads topped by a final cap bead. Two or more welders work on each joint to provide the beads referred to above, and then leapfrog the next crew down the line to make another pass around the joint between a pair of pipe sections. This procedure is not only time-consuming, but requires the utilization of a large number of welders in order to keep pace with digging of the trench, placement of welded pipe sections in the trench, and covering the pipe with earth.

It is, therefore, the primary object of the present invention to provide automatic welding apparatus especially useful in interconnecting elongated pipe sections disposed in end-to-end relationship and with the number of manual welders required being thereby maintained at a minimum.

It is a particularly important object of the invention to provide welding apparatus as described, which is capable of placing all of the beads around the joint between a pair of abutting pipe sections, with the possible exception of the initial stringer bead which may be run manually.

A very important object of the invention is to provide welding apparatus for automatically welding the joint between a pair of pipe sections and which includes components for oscillating the consumable electrode across the joint in a manner to minimize running of the molten metal, regardless of the angle of inclination of the pipe sections during the welding operation.

It is to be recognized that when the pipe sections are welded together in the field, the sections are oftentimes located in disposition with the longitudinal axes thereof at an angle with respect to the horizontal, depending upon the angularity of the terrain through which the trench is being dug. It is preferred that the pipe sections be located slight above the ground on structure having supporting surfaces in substantially equidistant spaced relationship from the ground, whereby the pipe sections necessarily follow the configuration of the terrain. Thus, during welding of the joints between the pipe sections, there is a tendency of the molten metal to run to the side of the joint, depending upon the degree of angularity of the pipe sections with respect to the horizontal. The tendency of the molten metal to run to the side of the joint is increasingly more difficult to overcome as the angularity of the longitudinal axes of the pipe sections with respect to the horizontal, increases.

It is, therefore, an important object of the invention to provide welding apparatus wherein is included structure engaging the welding head receiving the consumable electrode for oscillating the welding head in a direction to move the electrode back and forth across the joint, and with the structure being manually adjustable in a manner to permit variation of the direction of travel of the electrode so that the segments of the path may be maintained as nearly horizontal as possible as the electrode is advanced along the joint between the pipe sections from the upper portion thereof to the lower parts of the pipe. A still further important object of the invention is to provide apparatus of the type referred to above, wherein the direction of movement of the electrode during oscillation thereof may be altered as the electrode is advanced along the joint to minimize the tendency of the molten metal to flow, notwithstanding the pipe sections being disposed at a considerable angle with respect to the horizontal, and with imaginary lines bisecting the angularly disposed segments of the path of travel of the electrode during oscillation of the same being maintained substantially parallel throughout the welding operation.

A further important object of the invention is to provide automatic welding equipment for interconnecting pipe sections wherein is provided power means operably coupled to the welding head receiving the consumable electrode for oscillating the head and thereby the electrode, at a predetermined rate during advancement of the welding head through an angular path of travel around the joint between a pair of pipe sections and with the path of travel of the electrode being altered during oscillation thereof, by the simple expedient of rotating the welding head about the longitudinal axis of the consumable electrode whereby the path of travel of the electrode may be altered through manually manipulable means and during constant advancement of the electrode along the joint.

Another important object of the invention is to provide automatic welding equipment as set forth above, wherein the provision of structure for rotating the welding head about an axis through the consumable electrode, and thereby radial to the longitudinal axes of the pipe sections, permits the welding equipment to be used to automatically form a bead in a joint between a pair of the pipe sections throughout the entire circumference of the joint and by starting the electrode at the top of the pipe sections, advancing the same in one direction around the joint to the lower part thereof, then returning the welding head to the upper portion of the pipe sections and causing the same to advance around the remaining section of the joint. In this respect, it is a further important object of the invention to provide apparatus wherein the welding head may be rotated through a sufficient arc and in opposite directions so that the path of oscillatory travel of the electrode may be varied, regardless of the direction in which the electrode is caused to advance downwardly along the joint between the abutting pipe sections.

An additional important object of the invention is to provide a novel method of interconnecting pipe sections disposed in end-to-end relationship wherein is included the step of oscillating the consumable electrode in directions causing imaginary lines bisecting the angles between adjacent imaginary, angularly disposed segments of the path of travel of the electrode to be substantially horizontal throughout advancement of the electrode around the joint between adjacent pipe sections regardless of the angularity of the longitudinal axes of the pipe sections with respect to the horizontal. It can, therefore, be recognized that another important object of the present invention is to provide a method wherein the direction of oscillation of the electrode is varied during advancement thereof around the joint to maintain the imaginary lines bisecting the angularly disposed segments of the path of travel of the electrode to remain substantially horizontal at all times, regardless of whether the electrode is being advanced along the upper curved portion of the joint, or along the lower arcuate section of the joint on one side of the pipe sections.

An important object of the invention relates to provision of apparatus for automatically interconnecting pipe sections disposed in abutting, end-to-end relationship, wherein the welding head, which is pivotal about an axis causing the electrode to oscillate back and forth across the joint between the pipe sections, as well as being rotatable about an axis intersecting the axis of swinging movement of the welding head and radial to the longitudinal axes of the pipe sections, is mounted for swinging movement about an axis parallel to the longitudinal axes of the pipe sections spaced from the axes of rotation and swinging of the welding head and including structure engaging the outer surface of one of the pipe sections to thereby maintain the consumable electrode in predetermined spaced relationship from the joint, regardless of the cross-sectional configuration of the pipe sections.

Other important objects of the invention relate to the provision of novel support means for the welding head including a substantially C-shaped support unit adapted to be mounted on one of the pipe sections in spanning relationship thereto adjacent the joint between a pair of the pipe sections, and with a carrier being rotatably mounted on the support unit, movable in an arcuate path of travel around the support unit and carrying the welding head thereon so that during rotation of the carrier with respect to the support unit, the welding head is advanced along an angular path of travel in direct overlying relationship to the joint to permit automatic placement of the molten material in the joint; to the provision of automatic equipment as described, wherein a hot pass bead, a number of filler beads, as well as a final cap bead, may be placed in the joint between adjacent pipe sections by a single welder operating the present apparatus; to the provision of welding apparatus which is adapted to be used in pairs with the welding heads thereon positioned in head-to-head relationship directly overlying the joint between the pipe sections and with one of the heads being moved in one direction around the joint, while the other head is advanced in the opposite direction around such joint, thereby materially minimizing the number of welders required to effect interconnection of the pipe sections; to the provision of a novel support unit for movably supporting the welding head in direct overlying relationship to the joint, and with the support means being releasably secured to one of the pipe sections in a manner such that the same is held firmly in place even though the welding head is shifted around the entire circumference of the pipe sections; to the provision of a support unit as defined which is of C-shaped configuration so that the same may be readily placed over one of the pipe sections, secured thereto, then disconnected from the pipe section and moved along the same to a point adjacent the proximal end of another pipe section to be interconnected to the first pipe section set forth above; and to other objects and important details of the present apparatus, as well as the instant method, all of which will be made clear or become obvious as the following specification progresses.

In the drawings:

FIG. 6 is an enlarged, fragmentary, vertical, sectional view taken on line 6—6 of FIG. 3;

FIG. 7 is a fragmentary, vertical, sectional view on line 7—7 of FIG. 4;

FIG. 8 is an enlarged, vertical, sectional view through the welding head forming a part of the present apparatus;

FIG. 11 is a fragmentary, schematic representation of a pair of pipe sections in end-to-end relationship and located with the longitudinal axis thereof at an angle with respect to the horizontal, the path of travel of the consumable electrode during the welding operation being shown by a zigzag line to illustrate the manner in which running of the molten material is minimized during advancement of the electrode around the joint between the pipe sections.

Briefly, the present welding apparatus includes a generally C-shaped support unit adapted to be placed over a pipe section in spanning relationship thereto and adjacent the joint between such pipe section and another pipe disposed in aligned, abutting relationship thereto.

A C-shaped carrier is rotatably mounted on the support unit and carries a welding head which is pivotal about an axis to cause the welding head to be rotatable about an axis permitting the lowermost extremity of the welding head to be moved back and forth across the joint between the pipe sections, as well as being rotatable about an axis through the electrode and in radial relationship to the longitudinal axes of the aligned pipe sections.

Power means is provided on the carrier and operably coupled to the welding head for oscillating the latter, while manually manipulable means is operably connected to the welding head in a manner so that the latter may be rotated about an axis through the consumable electrode to permit variation of the direction of movement of the electrode as the same is oscillated back and forth across the joint. A pair of prime movers are also mounted on the support unit to shift the carrier through an angular path of travel in opposite directions so that the welding head may be advanced around the entire circumference of the joint to effect automatic placement of welding heads in the joint to interconnect the pipe sections.

Figure 1:
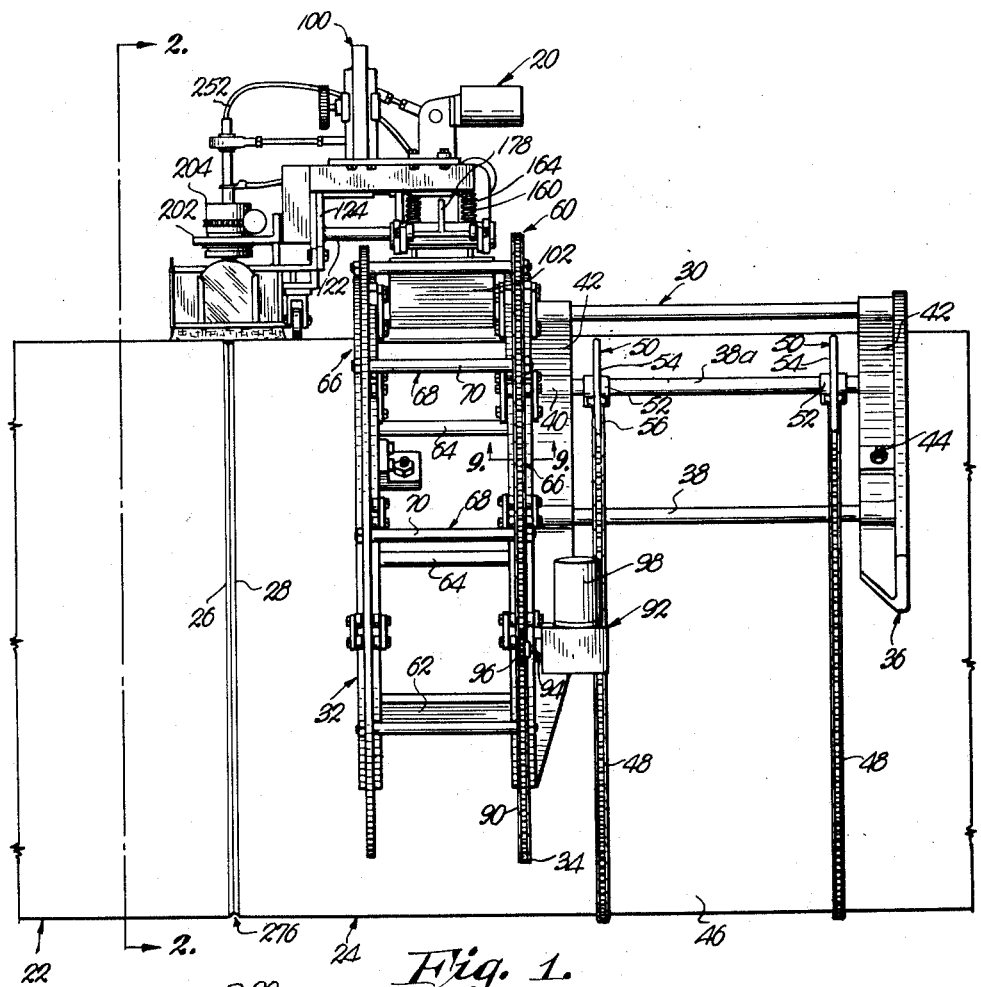
FIGURE 1 is a side elevational view of automatic welding apparatus embodying the preferred concepts of the present invention and shown mounted in place on a pipe section which is positioned in end-to-end abutting relationship to another pipe section.

Welding apparatus constructed in accordance with the present invention is broadly numerated 20 and is especially adapted for forming a welded joint between a pair of relatively large pipe sections 22 and 24. As explained previously, the pipe section 24 may comprise the end section of a pipeline which is disposed on the ground adjacent a trench in a position where the pipe may be readily moved into the trench and then covered with earth. The pipe section 22 is moved into alignment with section 24 with the longitudinal axes thereof in coaxial relationship and with the beveled extremity 26 of pipe section 22 in abutting relationship to the beveled extremity 28 of section 24. Although FIG. 1 shows pipe sections 22 and 24 in substantially horizontal disposition, it is to be understood that the pipe sections may be located with the longitudinal axes thereof at an angle with respect to the horizontal, as shown in FIG. 11, depending upon the characteristics of the terrain upon which the pipe sections 22 and 24 are disposed.

Apparatus 20 includes a support unit broadly designated 30, and provided with three generally C-shaped members 32, 34 and 36. The members 34 and 36 are substantially identical in construction and configuration and are provided with a plurality of tubular, integral bosses 40 on the outer surface thereof having passages therein receiving opposed ends of a corresponding number of elongated spacer rods 38 which serve to interconnect and maintain members 34 and 36 in spaced disposition, as best indicated in FIG. 1.

The semicircular, main body portions 42 of members 34 and 36 have a number of tapped openings therein for receiving threaded spacers 44 which extend through portions 42 and are located to engage the outer face 46 of section 24 to maintain members 34 and 36 in predetermined spaced relationship to surface 46. In order to permit firm fixation of support unit 30 to pipe section 24, a pair of link chains 48 are secured to one of the uppermost spacer rods 38 and are of sufficient length to extend around pipe section 24 below support unit 30, and to be releasably connected to an opposed rod 38a by manually releasable fastening means broadly designated 50. It is preferred that fasteners 50 be of toggle construction, permitting quick connection and release of the link chains 48 from rod 38a, and thus each toggle fastener 50 includes a hook 52 adapted to be placed over rod 38a and pivotally coupled through an operating handle 54 to a toggle connector link 56 secured to the proximal end of a corresponding link chain 48. The hooks 52 may thereby be released from rod 38a by the simple expedient of swinging operating handles 54.

Figure 3:
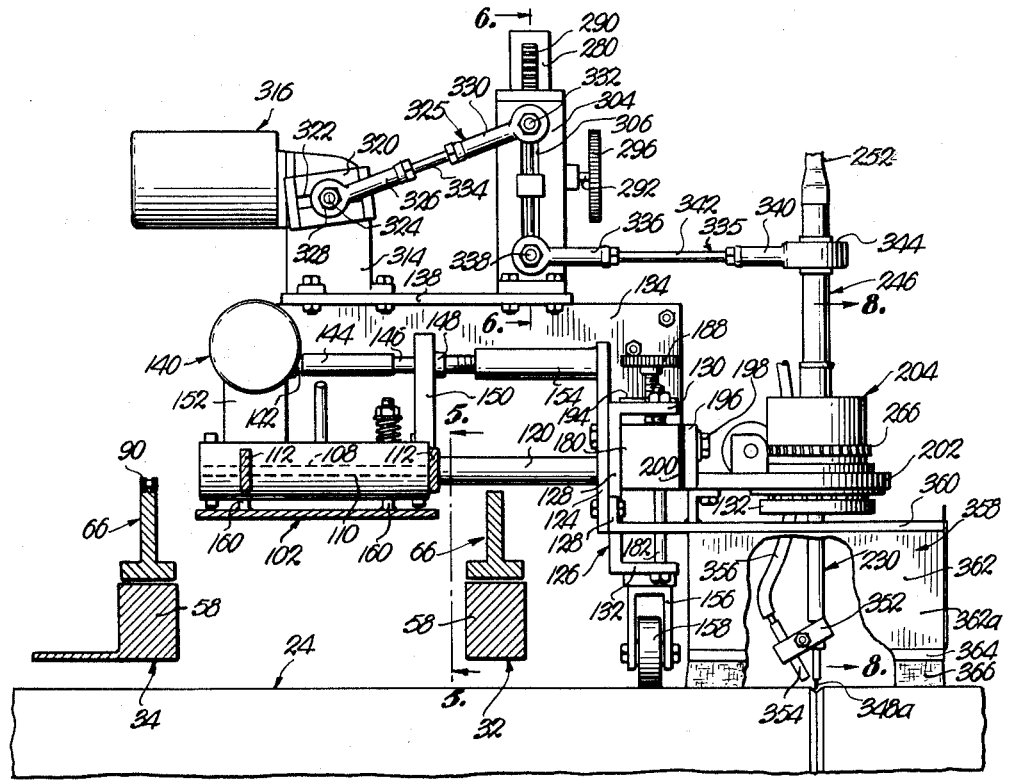
FIG. 3 is a side elevational view of the opposite side of the apparatus illustrated in FIG. 1, with certain of the components thereof being illustrated schematically and in section to better indicate the construction of the present apparatus.

The members 32 and 34 include a pair of semicircular segments 58 which are rectangular in cross section as shown in FIG. 3, and serve as means for supporting a carrier broadly designated 60, movable along an angular path of travel defined by the circumference of respective segments 58. Means for interconnecting segments 58 of members 32 and 34, and thereby maintaining segments 58 in predetermined spaced, complemental relationship, includes end cross members 62, as well as a series of crossbars 64 extending between opposed faces of segments 58 and suitably secured thereto. In most instances, it is preferable that crossbars 64 be of tubular configuration to receive elongated bolts which extend through segments 58 and are suitably connected thereto.

The carrier 60 comprises a pair of spaced, semicircular elements 66 of configuration to complementally overlie respective segments 58 of members 32 and 34 with connectors 68 being employed to maintain elements 66 in proper predetermined spaced relationship. Again, in the preferred construction, connectors 68 include elongated tubes 70 which receive suitable bolt means therein, and which in turn extend through elements 66 and are secured thereto by nut means or the like.

Figure 9:
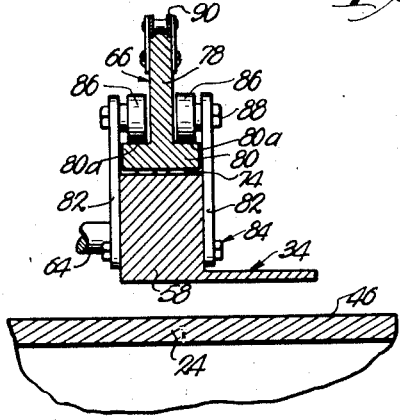
FIG. 9 is an enlarged, sectional view taken substantially on line 9—9 of FIG. 1.
Figure 10:
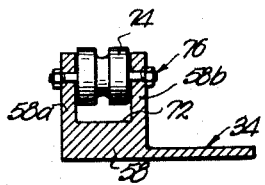
FIG. 10 is an enlarged, sectional view taken on line 10—10 of FIG. 2.

As shown in FIGS. 3, 9 and 10, the segments 58 of members 32 and 34 have a number of outwardly facing recesses 72 therein defined by opposed wall portions 58a and 58b of segments 58, and which receive a number of rollers 74 therebetween which are mounted on pin means 76 extending through opposed wall portions 58a and 58b of each of the segments 58. Although not illustrated in detail, it is pointed out that the pin means 76 is preferably mounted on wall portions 58a and 58b of segments 58 by suitable eccentric means permitting adjustment of the degree of recessing of rollers 74 within the recesses 72.

The elements 66 are generally T-shaped in cross section, as shown in FIGS. 3 and 9, and thereby include an outwardly extending plate portion 78 integral with a foot section 80 disposed to ride on rollers 74 during angular movement of carrier 60 with respect to support unit 30. In order to maintain carrier 60 on members 32 and 34 in proper disposition, a number of mounting plates 82 are secured to opposed faces of segments 58 at opposite ends thereof and extending upwardly into overlying relationship to adjacent elements 66, as best shown in FIG. 9.

Suitable securing means 84 mounts plates 82 on segments 58, while the outer margins of plates 82 remote from segments 58, carry a number of rollers 86 positioned between opposed plates 82, rotatable about suitable pivot means 88 and positioned to rotatably engage the outwardly facing surfaces 80a of the foot sections 80 of elements 66. The rollers 86 may also be eccentrically mounted on plates 82 to permit movement of rollers 86 toward and away from opposed segments 58 so that the pressure of the rollers 86 on surfaces 80a of foot sections 80 of elements 66 may be varied.

Figure 2:
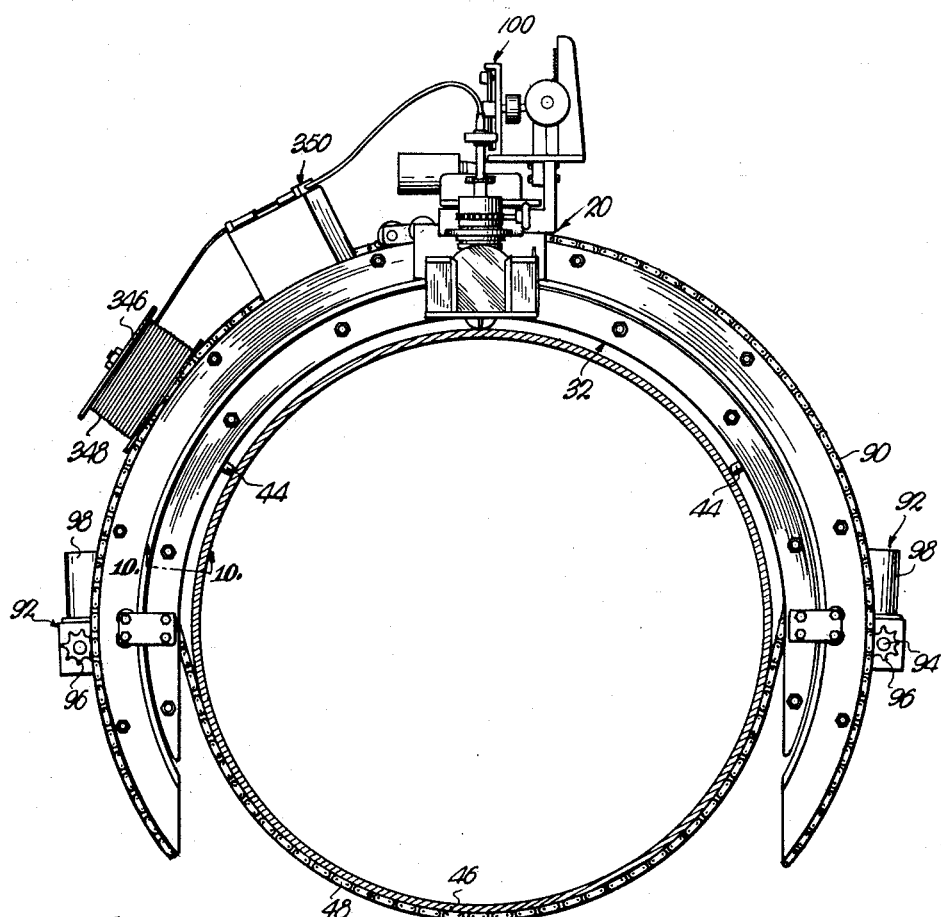
FIG. 2 is a vertical, cross-sectional view through one of the pipe sections on line 2—2 of FIG. 1 and looking in the direction of the welding apparatus mounted on the other pipe section.

Structure for effecting movement of carrier 60 with respect to support unit 30, includes a link chain 90 secured to the outer surface of the plate portion 78 of the element 66 overlying member 34. The opposed ends of body portion 42 of member 34 carries combination prime mover and gear box units 92, each having an output shaft 94 carrying a sprocket 96 disposed to intermesh with chain 90 as shown in FIG. 2. The prime movers 98 of units 92 are preferably in the nature of electric motors of the reversible type and which may be selectively energized in a manner as will be made clearer hereinafter.

A welding unit broadly denominated 100, is mounted on carrier 60 for movement therewith and includes a main base plate 102 which is of generally rectangular configuration and secured to and overlying a number of the tubes 70 interconnecting elements 66 of carrier 60.

Figure 5:
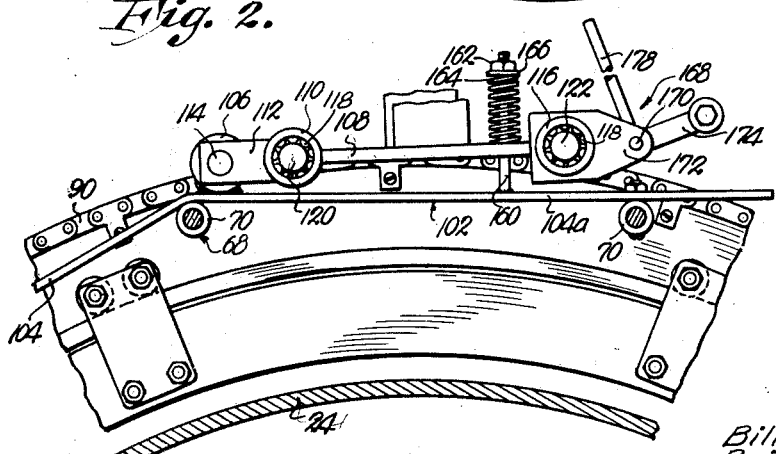
FIG. 5 is an enlarged, fragmentary, vertical, cross-sectional view taken on line 5—5 of FIG. 3 and looking in the direction of the arrows.

Plate 102 is bent longitudinally thereof in a manner such that the rectangular segments 104 thereof lie in planes adjacent tubes 70 as shown in FIG. 5. The end segment 104a of plate 102, carries an elongated sleeve 106 in disposition with the longitudinal axis thereof parallel with tubes 70. A rectangular mounting plate (FIG. 5) 108 overlies segment 104a and is secured to a tubular member 110 having a pair of outwardly projecting mounting lugs 112 thereon positioned on opposite ends of sleeve 106 and receiving an elongated connector pin 114 extending through sleeve 106. It is to be understood that the means for pivotally mounting plate 108 on segment 104a, and including sleeve 106, may comprise a commercially available unit having ballbearing means therein to assure relatively frictionless rotation of pin 114 relative to sleeve 106. Another tube 116 is secured to plate 108 at the extremity thereof opposed to tube 110 and in parallel relationship to the latter. Tubes 110 and 116 are also provided with ballbearing means 118 therein which slidably support corresponding cylindrical rods 120 and 122 which project outwardly from tubes 110 and 116 in a direction away from member 34 of support unit 30.

An elongated plate 124 is secured to the outer extremities of rods 120 and 122 remote from plate 108 and serves as means for carrying a transversely U-shaped mounting bracket 126 having an upright wall portion 128, an upper wall portion 130 perpendicular to wall portion 128, and a lower rectangular wall portion 132 parallel with wall portion 130. An L-shaped bracket arm 134 (FIG. 3) secured to an upright member 136 carried by plate 124, projects rearwardly over plate 102 and serves as means for mounting a rectangular plate 138 which overlies a part of rod 122, as well as rectangular section 104a of plate 102.

Means for shifting welding unit 100 with respect to plate 102, includes a prime mover and gear box unit 140 mounted on plate 108 adjacent sleeve 106 and having an output shaft 142 coupled through connector 144 to a shaft 146 extending through a bearing 148 therefor in upright bearing block 150 positioned adjacent the margin of plate 108 proximal to plate 124. The outer extremity of shaft 146 remote from the gear box 152 of unit 140, is externally threaded and complementally received within an internally threaded member 154 secured to the upper portion of plate 124 and extending toward unit 140 as shown in FIG. 3.

A sheave unit 156 secured to the under face of wall portion 132 of bracket 126, rotatably carries a roller 158 positioned to engage the outer surface of pipe section 24, as shown in FIG. 3. Means for biasing the roller 158 into firm engagement with pipe section 24, includes a rod 160 secured to the upper face of segment 104a of plate 102 projecting upwardly therefrom and through an opening for the same in plate 108 and terminating in spaced relationship to the upper face of such plate. The uppermost extremity of rod 160 is externally threaded and receives a nut 162 thereover, while a coil spring 164 is provided on rod 160 between the upper face of plate 108 and a washer 166 underlying nut 162. Means for shifting plate 108 away from section 24 a sufficient distance to cause roller 158 to clear surface 46, is broadly designated by the numeral 168 and includes a rod 170 rotatably carried between a pair of ears 172 on opposite extremities of tube 116. A pair of lugs 174 secured to rod 170 adjacent ears 172, have rollers 176 thereon positioned to engage the upper face of segment 104a as the operating handle 178, secured to rod 170, is swung in an angular path of travel.

A block 180 (FIG. 7) received between wall portions 130 and 132 of bracket 126, and movably therebetween, is provided with a pair of spaced, parallel passages therethrough slidably receiving elongated pins 182 secured to and extending between adjacent faces of wall portions 130 and 132. In this manner, block 180 is restricted to a rectilinear path of travel between wall portions 130 and 132 of bracket 126.

Wall portion 130 is provided with an opening 184 therein intermediate pins 182 for clearing an elongated adjustment member 186 which is complementally threaded into block 180 and has an operating handle 188 on the upper extremity thereof above wall portion 130. A ring 190, secured to the upper portion of member 186, is complementally received within a recess 192 therefor in the upper face of wall portion 130, while hold-down means 194 is secured to the upper face of wall portion 130 in surrounding relationship to member 186 and directly overlying ring 190 to maintain member 186 in predetermined disposition with respect to bracket 126.

A bracket element 196 secured to block 180 by fastening means 198 and separated from the face of block 180 by a layer of insulation 200, carries a forwardly extending bracket plate 202 which carries the welding head broadly numerated 204.

As shown in FIG. 8, plate 202 has a central opening 206 therein for clearing a sleeve element 208 which is secured to the upper race 210 of a ballbearing unit 212. A flange 214 integral with and extending outwardly from the outer face of sleeve 208, underlies plate 202 and is secured thereto by screws 216. The lower race 218 of unit 212, surrounds the lower extremity of sleeve 208 and is complementally received by an annulus 220 on the underside of sleeve 208. A tubular support member 222 having a central passage 224 therein, overlies and is mounted on sleeve 208, while elongated bolts 226 extending through annulus 220 and threaded into the under face of support member 222, serve to maintain annulus 220 and member 222 on sleeve 208. It is to be noted that the central opening 228 in annulus 220 is of substantially equal diameter to the passage 224 and coaxial therewith.

A welding rod guide nozzle broadly designated 230, is carried by support member 222 and includes an upper, enlarged cylindrical portion 232 having a central bore 234 therethrough and provided with a pair of opposed, outwardly extending projections 236 thereon which are complementally received within corresponding cross passages 238 in the side wall of support member 222. The outer extensions 240 on projections 236 are rotatably received within corresponding needle bearings 242 within passages 238.

The upper end of enlarged portion 232 of nozzle 230, is provided with an internally threaded bore 244 coaxial with bore 234 and adapted to complementally receive the lower threaded extremity of an elongated welding rod guide 246. An electrode lug 248 is interposed between the lower end of guide 246 in the upper face portion 232 and is coupled to an electrode cable 250 which extends to a welding control unit forming no part of the present invention. A flexible outer cable 252 is positioned over the upper extremity of guide 246, while a somewhat smaller inner flexible cable 254, extends downwardly into the bore 256 of guide 246 and is releasably secured to the guide by a pair of opposed setscrews 258 which project through the side wall of the lower part of guide 246. An expendable guide tube 260 is mounted on the lower extremity of nozzle 230 by a coupling 262, threaded into nozzle 230, as well as by a cup-shaped nut 264 over the lower end of coupling 262.

A ring gear 266 surrounding sleeve 208 below support member 222 and secured to sleeve 208, is positioned to operably intermesh with a worm 268 (FIG. 4) on a shaft 270 carried by a U-shaped bracket 272 projecting upwardly from plate 202 between sleeve 208 and bracket element 196. An operating handle 274 on the outer end of shaft 270, facilitates rotation of the latter to move worm 268.

Figure 4:
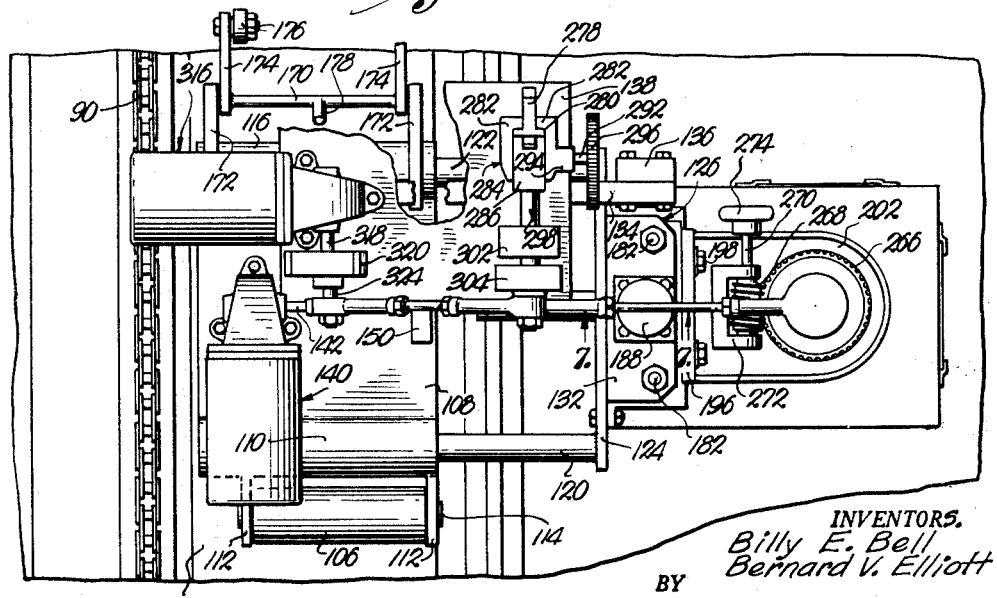
FIG. 4 is a plan view of the apparatus as shown in FIG. 3 with certain portions of the structure being broken away to more clearly reveal the components thereunder.

Mechanism for oscillating nozzle 230 back and forth across the beveled joint 276 between pipe sections 22 and 24, comprises an upright support member 278 on plate 138, and having a rectangular plate portion 280 on one upright face thereof presenting a track carrying a pair of opposed, transversely L-shaped components 282 forming a part of the gear box units 284. As shown in FIGS. 4 and 6, unit 284 includes a central housing 286 between and carrying components 282 with housing 286 rotatably carrying an internally disposed pinion 288 positioned to operably intermesh with a rack 290 mounted on and extending substantially the full longitudinal length of plate portion 280 of support member 278. The shaft 292 having pinion 288 thereon, projects outwardly through a tubular boss portion 294 of one of the components 282 and carries an operating handle 296 on the outer extremity thereof facing toward welding nozzle 230, as shown in FIG. 4. Upon rotation of operating handle 296, pinion 288 is caused to rotate in a manner to effect shifting of unit 284 along the longitudinal length of rack 290.

An elongated rod 298 secured to housing 286 of unit 284, is coupled to a pin 300 by a bearing assembly 302 which permits pin 300 to rotate relative to rod 298.

An upright, transversely U-shaped bracket 304 mounted on plate 138 in direct opposition to support member 278, has an elongated slot 306 therein for clearing pin 300 as indicated in FIG. 6. A block 308 secured to pin 300 within the confines of bracket 304, is provided with a central passage 310 therethrough which slidably receives an elongated connector rod 312.

Bracket 314 on plate 138 remote from welding head 204, carries a prime mover and gear box unit 316 having an output shaft 318 parallel with rod 298. An eccentric block 320 secured to shaft 318 for rotation therewith, has a longitudinal slot 322 therein receiving a movable shaft 324 which is operably coupled to a connector 326 having a central bearing 328 therein whereby connector 326 is rotatable relative to shaft 324. Connector 326 forms a part of linkage 325 interconnecting shaft 324 and rod 312.

Connector 330 of linkage 325 and similar to connector 326, is pivotally jointed to the upper extremity of rod 312 by shaft and bearing means 332, while a threaded coupling 334 operably joins opposed ends of connectors 326 and 330.

Linkage 335 joining rod 312 to welding head 204, includes a connector 336 pivotally joined to the lower extremity of rod 312 by shaft and bearing means 338, while connector 340 of linkage 335, joined to connector 336 by a coupling rod 342, has a tubular bearing 344 therein telescoped over and secured to the upper extremity of guide 246. It is to be noted that tubular bearing 344 is permitted to swing about intersecting axes through the central portion of connector 340 during oscillation of rod 312 by unit 316.

The segment of plate 102 remote from welding head 204, rotatably carries a reel 346 containing a supply of consumable welding rod 348 which passes through automatic advancement mechanism broadly designated 350, also mounted on plate 102 intermediate reel 346 and welding head 204, and thence downwardly into the inner flexible cable 254 for disposition in nozzle 230. The manner in which the rod 348 is caused to project downwardly from tube 260 into predetermined relationship from joint 276, is well known in the art and need not be explained in detail. It is further understood that advancement mechanism 350 is under the control of the welding unit which supplies current to cable 250.

A bracket 352 mounted on the lower extremity of nozzle 230 and preferably carried by coupling 262, mounts a gas nozzle 354 in a disposition such that gas is forced against the lower extremity 348a of the welding rod 348. A gas supply conduit 356 operably coupled to nozzle 354 is connected to a suitable supply of gas such as $CO_2$ and which is also under the control of the welding equipment.

In order to protect the operator of apparatus 20 from sparks and molten bits of metal, a protective housing is provided around the lower extremity of nozzle 230 in protecting relationship to the extremity 348a of rod 348. Housing 358 includes an upper horizontal wall 360 secured to bracket 126, as well as plate 24, and mounting rectangular side wall members 362 which define a cubicle area in surrounding relationship to nozzle 230, it being understood that wall 360 is provided with an opening therein of sufficient diameter to clear nozzle 230 and permit the same to oscillate, as will be described. One of the side walls 362a has a rectangular opening therein for receiving a transparent protective member 364 which permits the operator to view the interior of housing 358. Asbestos webbing 366 is provided on the lower extremities of side wall members 362 and positioned to slidably engage the outer surface of section 24 during advancement of welding head 204.

*Operation*

The pipe section 22 is moved into disposition in coaxial alignment with pipe section 24 and with the beveled extremities 26 thereof in abutting relationship. Welders utilizing portable welding equipment, then manually form a stringer bead around joint 276 to provide an initial interconnection between the pipe sections.

Next, apparatus 20 is shifted downwardly along pipe section 24 until the lower extremity of tube 260 is in substantial alignment with joint 276. The hooks 52 are then placed over rod 38a and the operating handles 54 are swung to securely clamp support unit 30 to pipe section 24 as the spacers 44 maintain members 32, 34 and 36 in predetermined spaced relationship from surface 46.

It is to be understood that the operator of the apparatus is provided with a control box which he may hold in his hands and thereby selectively control units 92, 140 and 316, as well as the equipment which effects automatic advancement of welding rod 348 and supply of $CO_2$ to tube 354. It is desirable to first place a hot pass bead around joint 276 and, therefore, a reel 346 of welding rod having a diameter of 5/64 of an inch is threaded into apparatus 20 and passed downwardly through nozzle 230. The extremity of 348a of the welding rod 348 is adjusted to bring the rod into predetermined spaced relationship to the beveled edges 26 and 28 of pipe sections 22 and 24.

Next, the reversible electric motor of unit 140 is energized in a manner to cause shaft 142 to be rotated in a direction to effect shifting of member 154 outwardly or inwardly with respect to plate 102, depending upon the direction in which it is desired to shift the welding extremity 348a of welding rod 348. Inasmuch as shaft 146 is threaded into member 154, it can be seen that rotation of shaft 142 causes member 154 to be shifted toward or away from plate 102, thereby moving the welding unit 100 longitudinally of pipe sections 22 and 24. By virtue of the gear arrangement provided by the gear box 152 of unit 140 and the shaft 146 threaded into member 154, very accurate positioning of the extremity 348a of welding rod 348 may be obtained. During initial positioning of welding rod 348, it is preferred that the member 364 be removed from housing 358 so that the welder may observe the tip 348a of rod 348.

Next, the motor of unit 316 is energized to cause shaft 318 to rotate and thereby effecting rotation of block 320 which is in eccentric relationship to the axis of shaft 318 as shown in FIG. 4. Rotation of block 320 causes the linkage defined by connectors 326 and 330, as well as coupling 334, to be moved in an arcuate path of travel defined by the path of rotation of shaft 324 whereby rod 312 is caused to pivot about an axis through pin 300. As rod 312 oscillates about the axis of pin 300, the linkage presented by connectors 336 and 340, as well as rod 342, is shifted back and forth to effect swinging of nozzle 230 about an axis through projections 236 and extensions 238. The tube 260 on the lower end of nozzle 230 is thereby moved back and forth across the joint 276 throughout energization of the motor of unit 316. It is desirable that the tube 260 move through a relatively wide path of travel during formation of the hot pass bead and, therefore, block 308 is disposed in a position causing the linkage 335 to move along a substantialy narrow path of travel. The sweep of the nozzle 230 during oscillation thereof, may be varied by rotating the handle 296 in a direction to shift unit 284 upwardly or downwardly along the rack 290. Rotation of shaft 292 in a direction to cause pinion 288 and thereby unit 284 to move upwardly along rack 290 as shown in FIG. 6, results in the block 308 being moved upwardly along rod 312 and thereby moving the pivot point of rod 312 into closer proximity to connector 330 than connector 336. In this manner, the linkage 335 is caused to move along a wider path of travel and increasing the swing of nozzle 230 across joint 276. Turning of operating handle 296 in the opposite direction to move unit 284 downwardly along rack 290, has the opposite result with respect to the width of the path of oscillation of nozzle 230.

Assuming that the pipe sections 22 and 24 are substantially level with respect to the horizontal, then operating handle 274 is rotated into disposition causing the lower extremity of nozzle 230 to follow a rectilinear path of travel prior to commencement of advancement of head 204 around joint 276 in generally parallel relationship to the longitudinal axes of sections 22 and 24.

One of the motors 98 of units 92 is then energized to cause the shaft 94 thereof to be rotated in a direction whereby the sprocket 96 thereon rotates the carrier 60 with respect to support unit 30. Viewing FIG. 2, if the right-hand unit 92 is actuated, and assuming that it is desired that the welding head 204 be moved downwardly to the right, then the sprocket wheel 94 is rotated in a counterclockwise direction, whereby the teeth of sprocket 96 engaging the link chain 90 on the element 66 overlying member 34, thereby move carrier 60 through an angular path of travel defined by members 32 and 34. During advancement of nozzle 230, the latter continues to oscillate back and forth across joint 276 and the current supplied to rod 348 by cable 250 effects melting of the welding rod to deposit molten metal in the beveled joint between extremities 26 and 28 of pipe sections 22 and 24.

CO₂ is supplied to the area being welded in sufficient quantity to exclude air and other contaminating gases from the molten material.

The nozzle 230 is advanced around the periphery of sections 22 and 24 until approximately the six o'clock point thereon. Motor 98 of unit 92 on the right-hand side of apparatus 20, as shown in FIG. 2, is then reversed to return the welding unit 100 to the twelve o'clock position, and it is to be understood that during return movement of the welding head 204, supply of current is discontinued to the welding rod 348. It is also to be preferred that the motors 98 be of variable speed so that return of welding unit 100 to the twelve o'clock position thereof, may be accomplished at a much faster rate than advancement of the welding head 204 during the actual welding operation.

The welding unit 100 is then moved in a counterclockwise direction to form the hot pass bead in the remaining portion of joint 276 by effecting energization of the left-hand motor 98 of the corresponding unit 92.

During the welding operation, the welder may readily adjust the disposition of welding rod 348 with respect to joint 276, the rate of advancement of welding head 204, as well as the degree and rate of oscillation of nozzle 230 by the controls which he holds in his hands.

If the pipe sections such as 22a and 24a (FIG. 11) are positioned on terrain at an angle with respect to the horizontal, then the welder rotates operating handle 274 in a direction to turn the worm 268 in a manner to rotate welding head 204 about the axis of nozzle 230 and thereby alter the direction of movement of the tip 348a during oscillation thereof.

In order to minimize running of molten material during filling of the joint 276, it has been found desirable to maintain the path of travel of the electrode during oscillation thereof as nearly horizontal as possible, regardless of the disposition of the pipe sections. Maintenance of the path of travel of the consumable electrode 348 in a horizontal path, may be accomplished by rotating the sleeve 208 under the action of worm 268 to shift the axis of swinging movement of nozzle 230 with respect to the shiftable unit 100. Thus, as shown by the serpentine lines across the joint 276a between pipe sections 22a and 24a, the head 204 may be rotated about an axis radial to the longitudinal axes of sections 22a and 24a to maintain the segments of the path of travel of the lower extremity of nozzle 230 substantially horizontal at all times.

It should be noted in this respect, that since the nozzle 230 is being continually advanced during oscillation thereof, the serpentine segments of the path of travel of the nozzle 230 will not be exactly horizontal, but in any event, it is desirable that imaginary lines bisecting the angularly disposed segments of the path of travel of the consumable electrode remain horizontal as the electrode is advanced along the joint 276a. A particularly important feature of apparatus 20 is the fact that the path of travel of the electrode 230 during oscillation thereof, may be altered by rotating handle 274 while the welding head 204 is being advanced.

After completion of the hot pass bead as outlined above, the 5/64 welding rod may be replaced by .035 wire with two filler beads, and a cap bead then being placed in joint 276 in the same manner as outlined above. During formation of the outer beads, it is necessary to increase the width of oscillation of the nozzle 230 to compensate for the increasing width of the joint defined by beveled extremities 26 and 28.

Another important factor in the construction of apparatus 20 is the way in which unit 100 is pivotally mounted on carrier 60 so that head 204 may move toward and away from joint 276. Inasmuch as the welding unit 100 is supported by roller 158, which rides on the outer surface 46 of pipe section 24, it can be seen that the tip 348a of electrode 348 is maintained in proper spaced relationship from joint 276, regardless of the cross-sectional configuration of pipe section 24.

Although only one welding unit such as apparatus 20 has been shown and described in detail, it is to be understood that a pair of automatic welders may be located in head-to-head relationship with the units 100 positioned approximately 60° out of phase. In this manner the joint 276 may be filled in half the time with one unit 100 being moved in one direction around the circumference of the pipe sections 22 and 24, while the other head unit 100 is moved in the opposite direction.

As specific examples of the operating conditions which have been found to be preferred for employing apparatus 20 to automatically form beads in joint 276, the following parameters indicate conditions which produce good weld joints:

| | 5/64 electrode | .035 electrode |
|---|---|---|
| Travel speed (inches per min.) | | |
|   1st bead (hot pass) | 15″–18″ | 15″–20″. |
|   2nd bead (filler) | 15″–18″ | 15″–20″. |
|   3rd bead (stripper if needed) | | 18″–24″. |
|   4th bead (cap) | | 10″–14″. |
| Amperage (current): | | |
|   1st bead (hot pass) | 220–240 amps | 160 amps. |
|   2nd bead (filler) | 220–240 amps | 160 amps. |
|   3rd bead (stripper if needed) | | 160–180 amps. |
|   4th bead (cap) | | 160 amps. |
| Voltage | 5/64 electrode | .035 electrode. |
|   1st bead (hot pass) | 20 volts | 19–21 volts. |
|   2nd bead (filler) | 20 volts | 20 volts. |
|   3rd bead (stripper) | | 20 volts. |
|   4th bead (cap) | | 20 volts. |
| Oscillation speed: | | |
|   1st bead (hot pass) | 80–200 | 80–200. |
|   2nd bead (filler) | 80–200 | 80–220. |
|   3rd bead (stripper) | | 80–220. |
|   4th bead (cap) | | 60–120. |
| Angle of incidence (electrode) | Straight for all beads | |
| Nozzle height (electrode) | ½″ | ½″. |
| Magnitude of oscillation: | | |
|   1st bead (hot pass) | 3/32″ | 3/32″. |
|   2nd bead (filler) | ¼″ | ¼″. |
|   3rd bead (stripper) | | 3/8″. |
|   4th bead (cap) | | 5/8″. |
| Quantity of CO₂ | 18–22 C.F.H. | 18–22 C.F.H. |
| Pipe joint spacing | Normal spacing for manual stringer bead. | |

When it is necessary to work on the lower extremity of welding head 204 presented by tube 260 and nozzle 230, this may readily be accomplished by swinging the handle 178 in a direction to move rollers 176 into engagement with the upper face of segment 104a of plate 102 and thereby move plate 108 away from plate 102 against the action of coil spring 164. Although not illustrated and described, it is further to be understood that rollers may be provided on support unit 30 so that upon release of link chains 48 from one of the pipe sections, the entire apparatus may be rolled along the interconnected pipe sections to the next joint to be welded.

Having thus described the invention, what is claimed as new and desired to be secured by Letters Patent is:

1. In welding apparatus for interconnecting a pair of pipe sections disposed in end-to-end relationship, a support unit adapted to be positioned adjacent the joint between said pipe sections; a welding head adapted to be operably coupled to a source of current and to receive a welding rod in disposition with one extremity thereof extending outwardly from the head; and mechanism mounting the head on the support unit for movement relative thereto and with said extremity of the welding rod overlying the joint between said pipe sections, said mechanism including means coupled to the head for swinging the latter in a direction to cause said extremity of the welding rod to move back and forth across said joint and for pivoting the head about an axis to vary the direction of movement of said extremity of the welding rod with respect to the longitudinal axes of said pipe sections.

2. Welding apparatus as set forth in claim 1, wherein said means includes structure permitting simultaneous swinging of the head and pivoting of the same about intersecting axes.

3. In welding apparatus for interconnecting a pair of pipe sections disposed in end-to-end relationship, a support unit adapted to be positioned adjacent the joint between said pipe sections; a welding head adapted to be operably coupled to a source of current and to receive a welding rod in disposition with one extremity thereof extending outwardly from the head; and mechanism mounting the head on the support unit for movement relative thereto and with said extremity of the welding rod overlying the joint between said pipe sections, said mechanism including means coupled to the head for swinging the latter about a first axis to move said extremity of the welding rod back and forth across said joint and for rotating the head in either direction about a second axis to vary the direction of movement of said extremity of the welding rod with respect to the longitudinal axes of said pipe sections.

4. Welding apparatus as set forth in claim 3 wherein said second axis is in substantial radial relationship to the longitudinal axes of said pipe sections and the first axis is in perpendicular, intersecting relationship to said second axis.

5. In welding apparatus for interconnecting a pair of pipe sections disposed in end-to-end relationship, a support unit adapted to be positioned on one of the pipe sections adjacent the joint between said pipe sections; a welding head adapted to be operably coupled to a source of current and to receive a welding rod in disposition with one extremity thereof extending outwardly from the head; mechanism mounting the head on the support unit for movement through a predetermined angular path around the joint between said pipe sections and with said extremity of the welding rod overlying said joint, said mechanism including power means coupled to said head for shifting the same along said angular path of travel; and means coupled to said head for swinging the latter in a direction to cause said extremity of the welding rod to move back and forth across said joint during movement of the head along said angular path of travel and for pivoting the head about an axis to vary the direction of movement of said extremity of the welding rod with respect to the longitudinal axes of said pipe sections.

6. In welding apparatus for interconnecting a pair of pipe sections disposed in end-to-end relationship, a support unit adapted to be positioned on one of the pipe sections adjacent the joint between said pipe sections; a welding head adapted to be operably coupled to a source of current and to receive a welding rod in disposition with one extremity thereof extending outwardly from the head; mechanism mounting the head on the support unit for movement through a predetermined angular path around the joint between said pipe sections and with said extremity of the welding rod overlying said joint, said mechanism including power means coupled to said head for shifting the same along said angular path of travel; means coupled to said head for swinging the latter in a direction to cause said extremity of the welding rod to move back and forth across said joint during movement of the head along said angular path of travel; and means connected to said head for rotating the latter about an axis generally radial to the axes of said pipe sections to vary the direction of movement of said extremity of the welding rod as said head is moved along the angular path of travel of the same.

7. In welding apparatus for interconnecting a pair of pipe sections disposed in end-to-end relationship, a support unit adapted to be positioned on one of the pipe sections adjacent the joint between said pipe sections; a welding head adapted to be operably coupled to a source of current and to receive a welding rod in disposition with one extremity thereof extending outwardly from the head; mechanism mounting the head on the support unit for movement through a predetermined angular path around the joint between said pipe sections and with said extremity of the welding rod overlying said joint, said mechanism including power means coupled to said head for shifting the same along said angular path of travel; means coupled to said head for swinging the latter about a first axis located intermediate the ends of said head and in spaced, generally perpendicular relationship to the longitudinal axes of said pipe sections; and means connected to said head for rotating the latter about a second axis intersecting said first axis generally radial to the axes of said pipe sections to vary the direction of movement of said extremity of the welding rod as said head is moved along the angular path of travel of the same.

8. Welding apparatus as set forth in claim 7, wherein said means for swinging the head about said first axis and said means for rotating the head about said second axis are independently and selectively actuatable.

9. Welding apparatus as set forth in claim 7, wherein said means coupled to the head for swinging the latter about said first axis includes power-operated structure for oscillating the head at a preselected rate.

10. Welding apparatus as set forth in claim 9, wherein said power-operated structure includes selectively actuatable means for varying the rate of oscillation of said head.

11. Welding apparatus as set forth in claim 7, wherein said mechanism includes components pivotally mounting the head on the support unit, and means on said head and disposed to engage the outer surface of the adjacent pipe section for maintaining the end of the head proximal to said outer surface of the pipe section in predetermined, spaced relationship to the pipe section regardless of the cross-sectional configuration thereof.

12. Welding apparatus as set forth in claim 11, wherein said mechanism includes means engaging the components for biasing the head toward said pipe sections.

13. In welding apparatus for interconnecting a pair of pipe sections disposed in end-to-end relationship, a generally C-shaped support unit adapted to be positioned on one of the pipe sections in spanning relationship thereto and adjacent the joint between said pipe sections; a longitudinally arcuate carrier mounted on said support unit for movement along an angular path of travel defined by said support unit; means on said support unit and operably coupled to said carrier for shifting the latter in opposite directions along said path of travel; a welding head adapted to be connected to a source of current and to receive a welding rod in disposition with one extremity thereof extending outwardly from the head; mounting means secured to said carrier for movement therewith and disposed to overlie said joint between the pipe sections when the support unit is in the normal position thereof on said one pipe section; a mounting member; means mounting the head on said member for pivoting movement relative thereto; and means rotatably mounting the member on said mounting means in disposition with said extremity of the welding rod aligned with and directly overlying the joint between said pipe sections, said member being rotatable about a first axis in radial relationship to the longitudinal axes of said pipe sections and the head being swingable about a second axis intersecting said first axis and in perpendicular relationship to said first axis and the longitudinal axes of said pipe sections.

14. Welding apparatus as set forth in claim 13, wherein is provided manually actuatable means coupled to said member for rotating the latter.

15. Welding apparatus as set forth in claim 13, wherein is provided a prime mover on said mounting means and manually adjustable, eccentric means operably coupling said prime mover to the head for oscillating the latter about said second axis.

16. Welding apparatus as set forth in claim 13, wherein is provided means on said support unit and operably coupled to said welding head for shifting the latter longitudinally of said pipe sections.

17. Welding apparatus as set forth in claim 16, wherein said means for shifting the welding head longitudinally of said pipe sections is actuatable simultaneously with oscillation of said welding head and advancement of the same around the joint between said pipe sections.

18. In a method of interconnecting a pair of pipe sections disposed in aligned, end-to-end relationship with the axes thereof positioned at an angle with respect to the horizontal, said method including the steps of positioning a consumable electrode over the joint between said pipe sections; supplying current to said electrode while shifting the latter toward said pipe sections at substantially the rate the electrode is consumed; advancing the electrode around the joint at a predetermined rate; and oscillating the electrode back and forth across the joint while the electrode is advanced around the joint whereby the electrode follows a substantially serpentine path, said electrode being oscillated in directions causing imaginary lines bisecting the angles between adjacent imaginary, angularly disposed segments of the path of travel of the electrode to be substantially horizontal throughout advancement of the electrode around said joint, the direction of oscillation of the electrode being varied during advancement of the electrode around the joint to maintain the imaginary lines bisecting said angularly disposed segments substantially horizontal at all times as the electrode is advanced.

References Cited by the Examiner

UNITED STATES PATENTS

| | | | |
|---|---|---|---|
| 1,801,140 | 4/31 | Chapman | 219—125 |
| 1,838,899 | 12/31 | Arnold | 219—125 |
| 1,933,340 | 10/33 | Raymond | 219—124 |
| 1,956,406 | 4/34 | Vars | 219—125 |
| 2,013,630 | 9/35 | Goldsborough | 219—60 |
| 2,795,689 | 6/57 | McNutt | 219—125 |
| 3,035,156 | 5/62 | Staley | 219—125 |

RICHARD M. WOOD, *Primary Examiner.*

ANTHONY BARTIS, *Examiner.*